(12) United States Patent
Iwamura et al.

(10) Patent No.: US 9,131,436 B2
(45) Date of Patent: Sep. 8, 2015

(54) MOBILE COMMUNICATION METHOD OF REQUESTING SYCHRONIZATION

(75) Inventors: Mikio Iwamura, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 74 days.

(21) Appl. No.: 14/111,726

(22) PCT Filed: May 11, 2012

(86) PCT No.: PCT/JP2012/062113
§ 371 (c)(1),
(2), (4) Date: Oct. 14, 2013

(87) PCT Pub. No.: WO2012/157551
PCT Pub. Date: Nov. 22, 2012

(65) Prior Publication Data
US 2014/0036890 A1    Feb. 6, 2014

(30) Foreign Application Priority Data

May 19, 2011    (JP) ................................. 2011-112659

(51) Int. Cl.
*H04W 56/00* (2009.01)
*H04W 92/18* (2009.01)

(52) U.S. Cl.
CPC .......... *H04W 56/001* (2013.01); *H04W 56/002* (2013.01); *H04W 56/0045* (2013.01); *H04W 56/0085* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2009/0270094 A1* | 10/2009 | Ito et al. ........................ 455/434 |
| 2012/0034923 A1 | 2/2012 | Nakai | |

FOREIGN PATENT DOCUMENTS

| | | | |
|---|---|---|---|
| JP | 2001-238264 | A | 8/2001 |
| JP | 2003-61152 | A | 2/2003 |
| JP | 2006-523408 | A | 10/2006 |
| WO | 2004/091238 | A1 | 10/2004 |
| WO | 2010/067672 | A1 | 6/2010 |
| WO | 2010/078271 | A2 | 7/2010 |
| WO | 2010/108549 | A1 | 9/2010 |

OTHER PUBLICATIONS

International Search Report for corresponding International Application No. PCT/JP2012/062113, mailed Aug. 7, 2012 (5 pages).

(Continued)

*Primary Examiner* — Omar Ghowrwal
(74) *Attorney, Agent, or Firm* — Osha Liang LLP (57) ABSTRACT

Provided is a mobile communication method, in which in direct communication between a mobile station UE#1 and a mobile station UE#2, synchronization between the mobile station UE#1 and the mobile station UE#2 is appropriately established. A mobile communication method according to the present invention includes a step of transmitting, by the mobile station UE#2, "Timing information #1" indicating deviation of a reception timing of "Ud preamble #1" from a desired timing to a radio base station eNB on the basis of a received "Ud preamble #1", and a step of transmitting, by the radio base station eNB, a "Ud TA command #1" for adjusting a transmission timing of a data signal in the third radio link to the mobile station UE#1 on the basis of received "Timing information #1".

9 Claims, 7 Drawing Sheets

(56) References Cited

OTHER PUBLICATIONS

Written Opinion for corresponding International Application No. PCT/JP2012/062113, mailed Aug. 7, 2012 (5 pages).
3GPP TS 36.321 V8.2.0; "3rd Generation Partnership Project; Technical Specification Group Radio Access Network; Evolved Universal Terrestrial Radio Access (E-UTRA) Medium Access Control (MAC) protocol specification (Release 8)" May 2008 (8 pages).
3GPP TS 36.323 V10.1.0; "3rd Generation Partnership Project; Technical Specification Group Radio Access Network; Evolved Universal Terrestrial Radio Access (E-UTRA); Packet Data Convergence Protocol (PDCP) specification (Release 10)"; Mar. 2011 (26 pages).
Office Action for corresponding Japanese Application No. 2011-112659, mailed Apr. 23, 2013 (8 pages).
Search Report issued in corresponding European Application No. 12785464.4, mailed Oct. 28, 2014 (7 pages).

* cited by examiner

MOBILE COMMUNICATION METHOD OF REQUESTING SYCHRONIZATION

TECHNICAL FIELD

The present invention relates to a mobile communication method.

BACKGROUND ART

Figure 7:
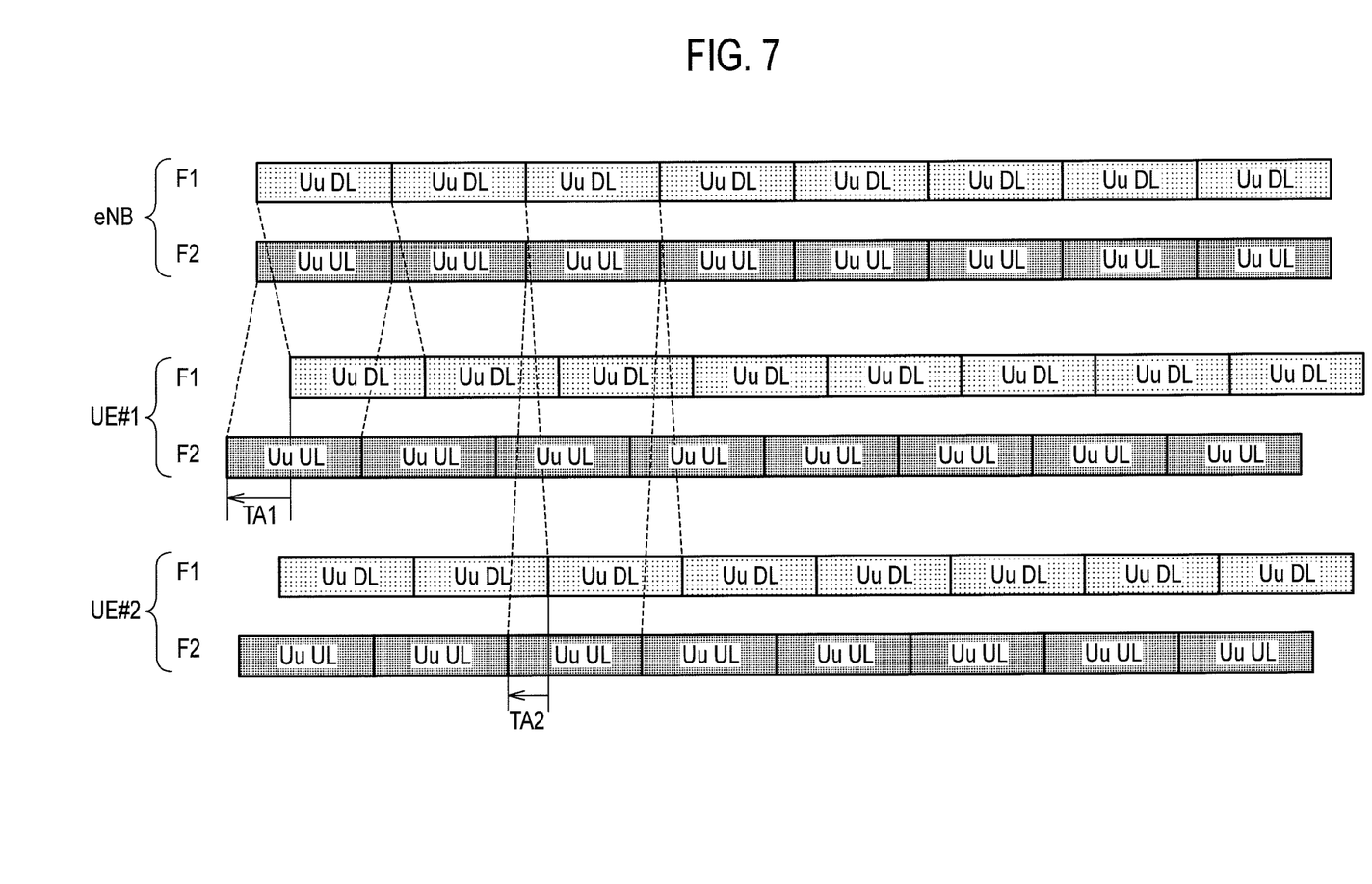
FIG. 7 is a diagram for explaining a conventional mobile communication system.

FIG. 7 illustrates an aspect of TA (Timing Advance) control in a conventional LTE (Long Term Evolution) scheme.

As illustrated in FIG. 7, in the TA control, a radio base station eNB is configured to align the reception timings ("Uu UL") of uplink signals, which are transmitted by a mobile station UE#1 and a mobile station UE#2, such that the uplink signals are orthogonal to each other, and to transmit "TA commands (TA1 and TA2)" to the mobile station UE#1 and the mobile station UE#2.

The mobile station UE#1 and the mobile station UE#2 are configured to adjust the transmission timings ("Uu UL") of uplink signals on the basis of the "TA commands (TA1 and TA2)" received from the radio base station eNB.

As described above, the TA control is applied, so that it is possible to correct propagation delay of the uplink signals.

CITATION LIST

Non Patent Literature

[NPL 1] 3GPP TS36.323

SUMMARY OF INVENTION

Here, in a conventional LTE mobile communication system, even when a plurality of mobile stations UEs are located in the same cell (or a cell subordinate to the radio base station eNB), since it is configured such that both a data signal and a control signal are transmitted or received via the radio base station eNB, there is a problem in that a processing load of the radio base station eNB increases.

It may be possible to resolve such a problem by using a feature that a plurality of mobile stations UE transmit and receive a data signal via a radio link in an interface between mobile stations (hereinafter, a Ud interface) without passing through a radio link in a Uu interface that is set between the mobile stations UE and the radio base station eNB.

When considering direct communication (that is, Ud communication or D2D communication) between the mobile station UE#1 and the mobile station UE#2, a distance between the mobile station UE#1 and the mobile station UE#2 is problematic in the adjustment of the transmission timing via the Ud interface.

Figure 8:
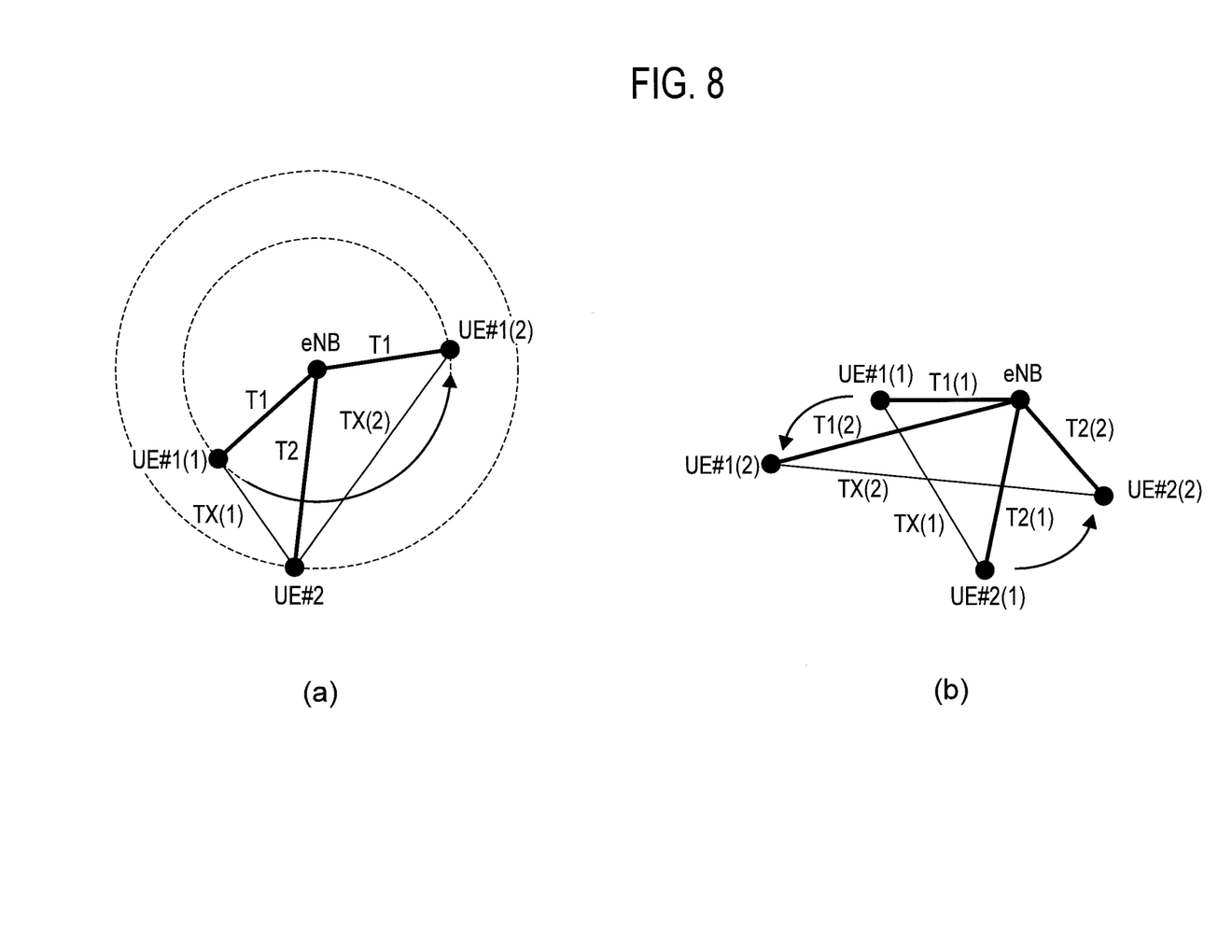
FIG. 8 is a diagram for explaining a conventional mobile communication system.

For example, as illustrated in FIG. 8(a), even when there is no change in a distance (propagation delay T1) between the mobile station UE#1 and the radio base station eNB and a distance (propagation delay T2) between the mobile station UE#2 and the radio base station eNB, if the mobile station UE#1 or the mobile station UE#2 moves on an arc, a distance (propagation delay TX) between the mobile station UE#1 and the mobile station UE#2 changes.

Furthermore, actually, a trajectory of each of the mobile station UE#1 and the mobile station UE#2 is complicated, and as illustrated in FIG. 8(b), it is considered that the distance (propagation delay TX) between the mobile station UE#1 and the mobile station UE#2 also changes simultaneously with the distance (the propagation delay T1) between the mobile station UE#1 and the radio base station eNB and the distance (the propagation delay T2) between the mobile station UE#2 and the radio base station eNB.

Therefore, the present invention has been achieved in view of the above-described problems, and an object thereof is to provide a mobile communication method capable of appropriately establishing synchronization between the mobile station UE#1 and the mobile station UE#2 in direct communication between the mobile station UE#1 and the mobile station UE#2.

A first characteristic of the present invention is summarized in that a mobile communication method, used in a case where a first radio link has been set in a radio base station interface between a first mobile station and a radio base station, a second radio link has been set in a radio base station interface between a second mobile station and the radio base station, and a third radio link has been set in an inter-mobile station interface between the first mobile station and the second mobile station, comprising: a step of transmitting, by the first mobile station, a synchronization request signal to the radio base station via the first radio link when generation of a data signal to be transmitted to the second mobile station is detected in a state in which synchronization of the third radio link has not been established; a step of notifying, by the radio base station, the first mobile station and the second mobile station of a radio resource for first preamble transmission in the third radio link via the first radio link and the second radio link in response to the synchronization request signal; a step of transmitting, by the first mobile station, a first preamble to the second mobile station by using the radio resource for first preamble transmission; a step of transmitting, by the second mobile station, first timing information indicating deviation of a reception timing of the first preamble from a desired timing to the radio base station via the second radio link on the basis of the received first preamble; and a step of transmitting, by the radio base station, first adjustment information for adjusting a transmission timing of a data signal in the third radio link to the first mobile station via the first radio link on the basis of the received first timing information.

DESCRIPTION OF EMBODIMENTS

Mobile Communication System According to First Embodiment of the Present Invention With reference to FIG. 1 through FIG. 4, a mobile communication system according to a first embodiment of the present invention will be described.

Figure 1:
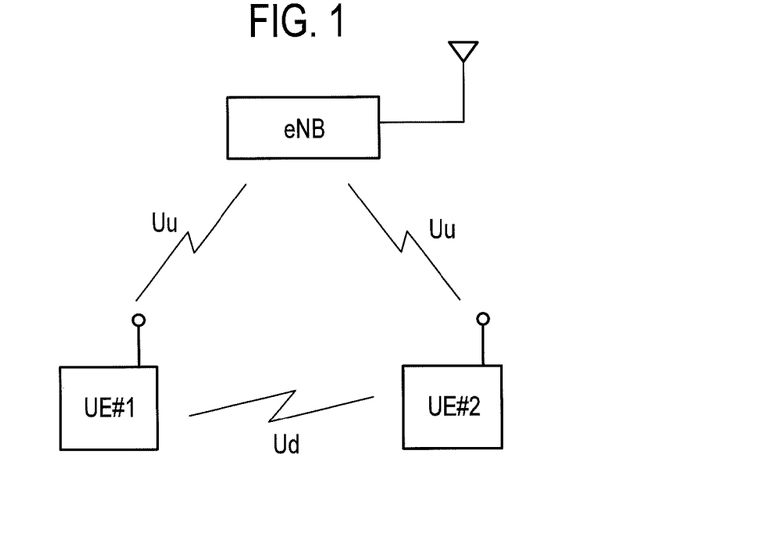
FIG. 1 is a diagram showing the entire configuration of a mobile communication system according to a first embodiment of the present invention.

A mobile communication system according to the present embodiment is an LTE mobile communication system, and includes a core network and a radio base station eNB connected to the core network device as illustrated in FIG. 1. The present invention is also applicable to cellular mobile communication systems other than the LTE mobile communication system.

In the mobile communication system according to the present embodiment, a Uu interface between a mobile station UE#1 and the radio base station eNB and between a mobile station UE#2 and the radio base station eNB, and a Ud interface between the mobile station UE#1 and the mobile station UE#2 have been defined.

In addition, in the mobile communication system according to the present embodiment, it is assumed that a first radio link has been established in the Uu interface between the mobile station UE#1 and the radio base station eNB, a second radio link has been established in the Uu interface between the mobile station UE#2 and the radio base station eNB, and a third radio link has been established between the mobile station UE#1 and the mobile station UE#2.

The mobile station UE#1 is configured to be able to transmit and receive a data signal to and from the mobile station UE#2 via the Ud interface without passing through the Uu interface.

Furthermore, the mobile station UE#1 is configured to be able to transmit and receive a data signal and a control signal to and from the radio base station eNB via the Uu interface.

In the same manner, the mobile station UE#2 is configured to be able to transmit and receive a data signal to and from the mobile station UE#1 via the Ud interface without passing through the Uu interface.

Furthermore, the mobile station UE#2 is configured to be able to transmit and receive a data signal and a control signal to and from the radio base station eNB via the Uu interface.

Figure 2:
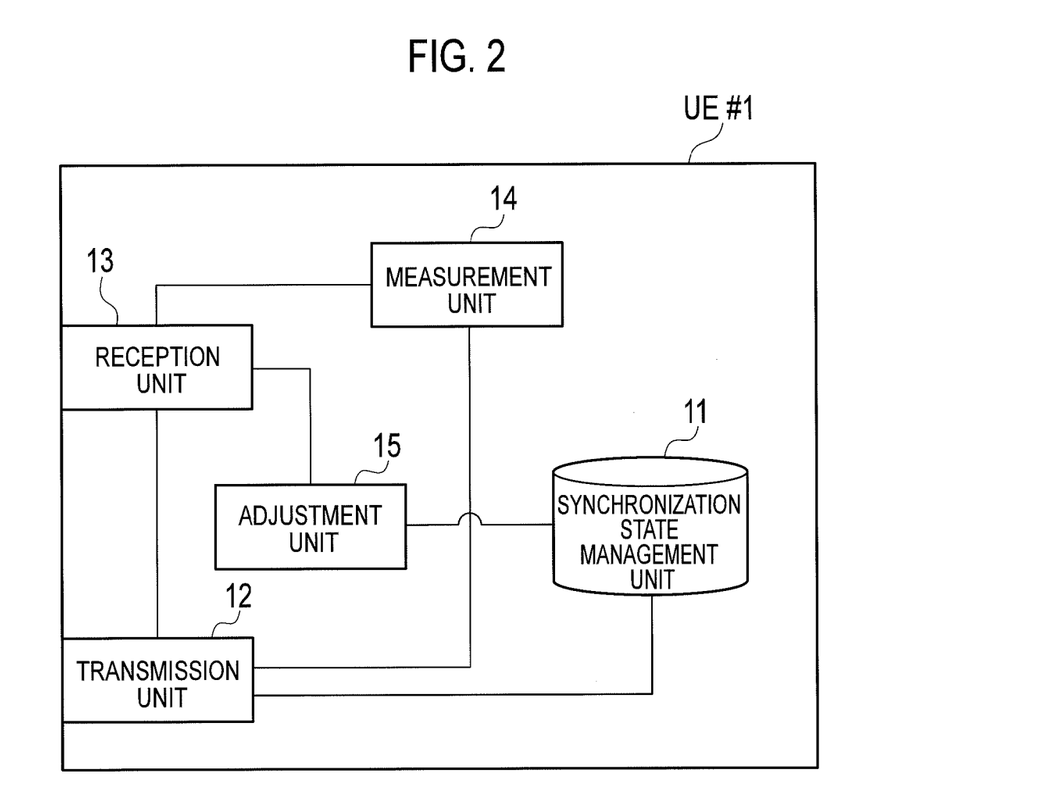
FIG. 2 is a functional block diagram of a mobile station according to the first embodiment of the present invention.

Since the function of the mobile station UE#1 and the function of the mobile station UE#2 are basically equal to each other, the function of the mobile station UE#1 will be representatively described below. As illustrated in FIG. 2, the mobile station UE#1 includes a synchronization state management unit 11, a transmission unit 12, a reception unit 13, a measurement unit 14, and an adjustment unit 15.

The synchronization state management unit 11 is configured to manage a synchronization state (synchronization/non-synchronization) of a radio link established in the mobile station UE#1.

For example, the synchronization state management unit 11 is configured to manage synchronization states of the aforementioned first radio link and third radio link.

Specifically, the synchronization state management unit 11 has a timer for the Uu interface and a timer for the Ud interface, and is configured to reset the timer for the Uu interface or the timer for the Ud interface whenever a "TA command" for the Uu interface or a "Ud TA command" for the Ud interface is received.

Furthermore, the synchronization state management unit 11 is configured to determine that the first radio link is in a "synchronization" state when the timer for the Uu interface is being activated, and to determine that the first radio link is in a "non-synchronization" state when the timer for the Uu interface is expired.

In the same manner, the synchronization state management unit 11 is configured to determine that the third radio link is in a "synchronization" state when the timer for the Ud interface is being activated, and to determine that the third radio link is in a "non-synchronization" state when the timer for the Ud interface is expired.

The timer for the Uu interface and the timer for the Ud interface may be the same timer, or different timers. In addition, values of the timer for the Uu interface and the timer for the Ud interface may be configured to be notified by the radio base station eNB.

The transmission unit 12 is configured to transmit a data signal and a control signal to the radio base station eNB via the first radio link in the Uu interface, and to transmit a data signal to the mobile station UE#2 via the third radio link in the Ud interface.

The reception unit 13 is configured to receive a data signal and a control signal from the radio base station eNB via the first radio link in the Uu interface, and to receive a data signal from the mobile station UE#2 via the third radio link in the Ud interface.

For example, in the state in which the synchronization of the third radio link has not been established, when the generation of a data signal to be transmitted to the mobile station UE#2 is detected, the transmission unit 12 is configured to transmit a "Ud sync request" to the radio base station eNB via the first radio link.

Alternatively, in the state in which the synchronization of the third radio link has not been established, when assignment notification of a transmission/reception opportunity via the Ud interface is received from the radio base station eNB, the transmission unit 12 is configured to transmit the "Ud sync request" to the radio base station eNB.

Furthermore, the transmission unit 12 is configured to transmit the "Ud sync request" as a "MAC control element".

Furthermore, when the reception unit 13 receives "Ud preamble allocation (UE#1→UE#2)" for notifying a radio resource for preamble transmission in the third radio link via the first radio link, the transmission unit 12 is configured to transmit a "Ud preamble" to the mobile station UE#2 by using the radio resource for preamble transmission.

Furthermore, the "Ud preamble allocation (UE#1→UE#2)" may be defined as the "MAC control element" or a dedicated format of PDCCH.

Furthermore, the transmission unit 12 may be configured to repeatedly transmit the "Ud preamble" by using "Power ramping".

In addition, on the basis of the reception timing (a subframe) of a downlink signal in the Uu interface or the transmission timing (a subframe) of an uplink signal in the Uu interface, the transmission unit 12 may be configured to determine the transmission timing (a subframe) of the "Ud preamble".

In addition, when the reception unit 13 receives a "Ud TA command", the transmission unit 12 may be configured to stop the transmission of the "Ud preamble".

Furthermore, when the reception unit 13 is not able to receive the "Ud TA command" from the mobile station UE#2 within a predetermined period, the transmission unit 12 may be configured to stop the transmission of the "Ud preamble".

In such a case, the transmission unit 12 may be configured to transmit the "Ud sync request" to the radio base station eNB via the first radio link again.

Alternatively, the transmission unit 12 may be configured to transmit "Ud failure" to the radio base station eNB as an RRC (Radio Resource Control) message via the first radio link.

The predetermined period may be designated in advance from the radio base station eNB via RRC signaling.

In the same manner, when "Ud preamble allocation (UE#2→UE#1)" for notifying a radio resource for preamble transmission in the third radio link is received via the first radio link, the reception unit 13 may be configured to receive the "Ud preamble" from the mobile station UE#2 by using the radio resource for preamble transmission.

When it is not possible to detect the "Ud preamble" within a predetermined period, the reception unit 13 may be configured to abandon the reception of the "Ud preamble".

Alternatively, when the reception unit 13 is not able to detect the "Ud preamble" within the predetermined period, the transmission unit 12 may be configured to report the fact that the reception unit 13 is not able to detect the "Ud preamble" to the radio base station eNB via the first radio link.

Furthermore, when the reception unit 13 is not able to detect the "Ud preamble" within the predetermined period, the transmission unit 12 may be configured to transmit the "Ud failure" to the radio base station eNB as the RRC (Radio Resource Control) message.

The predetermined period may be designated in advance from the radio base station eNB via RRC signaling.

The measurement unit 14 is configured to measure deviation of the reception timing of the "Ud preamble", which is received from the mobile station UE#2, from a desired timing.

Furthermore, the transmission unit 12 is configured to transmit "Timing information #2" indicating deviation of the reception timing of a "Ud preamble #2", which is measured by the measurement unit 14, from a desired timing via the first radio link.

The adjustment unit 15 is configured to adjust a transmission timing (a subframe) in the following Ud interface on the basis of the "Ud TA command" received by the reception unit 13.

Furthermore, the adjustment unit 15 is configured to calculate the desired timing on the basis of a relation between a reception window and the reception timing of "Ud preamble".

Figure 3:
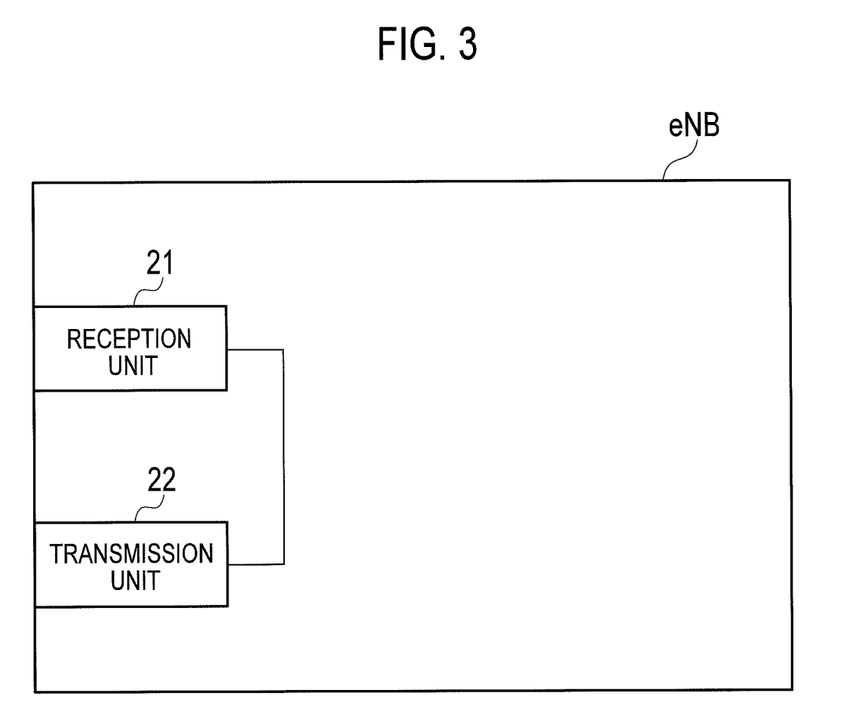
FIG. 3 is a functional block diagram of a radio base station according to the first embodiment of the present invention.

As illustrated in FIG. 3, the radio base station eNB includes a reception unit 21 and a transmission unit 22.

The reception unit 21 is configured to receive a data signal and a control signal from the mobile station UE#1 via the first radio link in the Uu interface, and to receive a data signal and a control signal from the mobile station UE#2 via the second radio link in the Uu interface.

The transmission unit 22 is configured to transmit a data signal and a control signal to the mobile station UE#1 via the first radio link in the Uu interface, and to transmit a data signal and a control signal to the mobile station UE#2 via the second radio link in the Uu interface.

When the reception unit 21 receives the "Ud sync request" from the mobile station UE#1, the transmission unit 22 is configured to transmit "Ud preamble allocation (UE#1→UE#2)" for notifying a radio resource for preamble transmission in the third radio link to the mobile station UE#1 and the mobile station UE#2.

In addition, the "Ud preamble" is assumed to be provided with a sufficient gap such that it is within a reception window even though there is significantly large timing deviation.

Furthermore, the transmission unit 22 may be configured to transmit the "Ud preamble allocation (UE#1→UE#2)" by a dedicated physical channel (corresponding to PRACH: Physical Random Access Channel).

In addition, the transmission unit 22 may be configured to designate a code (corresponding to a dedicated preamble) of the "Ud preamble" as the radio resource for preamble transmission.

Furthermore, on the basis of "Timing information" received by the reception unit 21, the transmission unit 22 is configured to transmit a "Ud TA command" for adjusting the transmission timing of a data signal in the third radio link to the mobile station UE#1 or the mobile station UE#2 via the first radio link or the second radio link.

Hereinafter, with reference to FIG. 4, the operation of the mobile communication system according to the present embodiment will be described.

Figure 4:
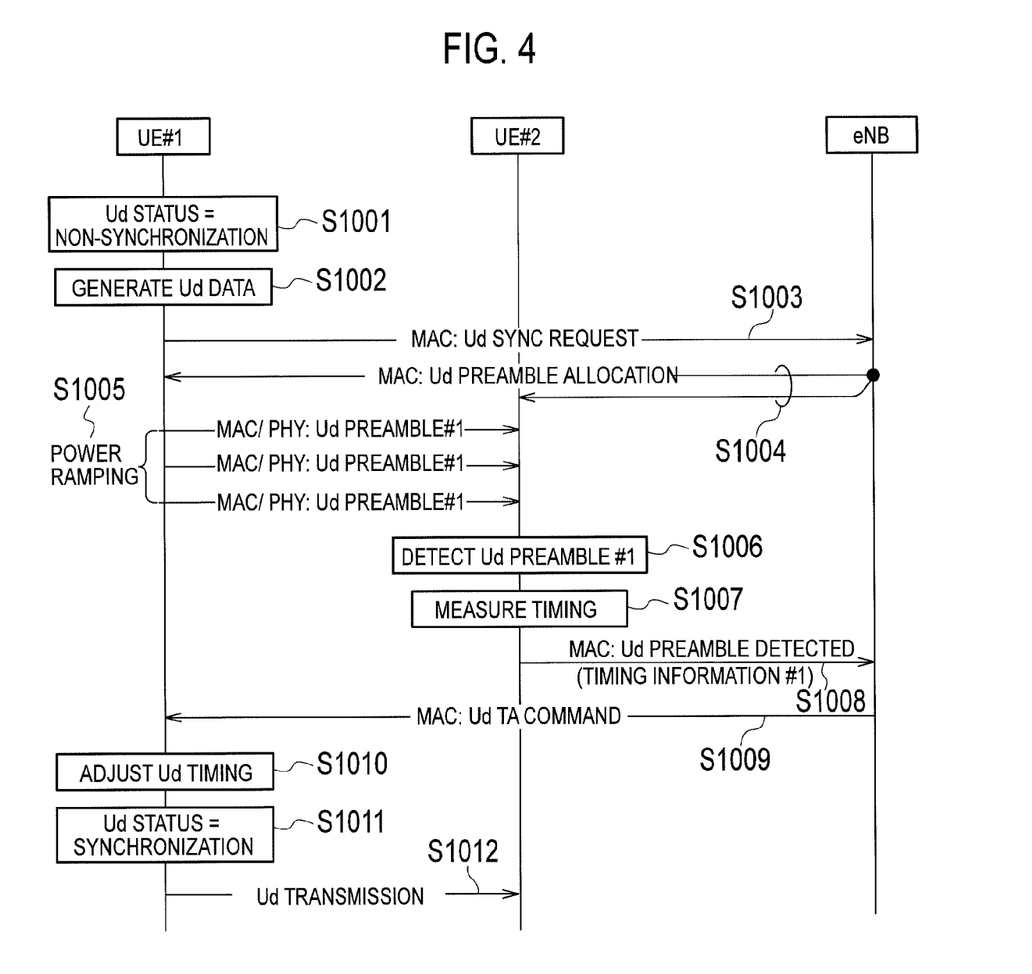
FIG. 4 is a sequence diagram showing operations in the mobile communication system according to the first embodiment of the present invention.

As illustrated in FIG. 4, in the state (step S1001) in which the synchronization of the third radio link has not been established, when the generation of a data signal to be transmitted to the mobile station UE#2 is detected (step S1002), the mobile station UE#1 transmits the "Ud sync request" to the radio base station eNB as the "MAC control element" in step S1003.

In step S1004, the radio base station eNB transmits the "Ud preamble allocation (UE#1→UE#2)" for notifying the radio resource for preamble transmission in the third radio link to the mobile station UE#1 and the mobile station UE#2 as the "MAC control element".

In step S1005, the mobile station UE#1 repeatedly transmits the "Ud preamble #1" to the mobile station UE#2 by using the radio resource (a MAC layer/a physical layer) for preamble transmission through the "Power ramping".

When the "Ud preamble #1" is detected in step S1006, the mobile station UE#2 measures deviation of the reception timing of the "Ud preamble #1" from a desired timing in step S1007, and transmits "Ud preamble detected" including "Timing information #1" indicating a result of the measurement to the radio base station eNB in step S1008.

Furthermore, the mobile station UE#2 may transmit the "Ud preamble detected" to the radio base station eNB as the "MAC control element".

In step S1009, on the basis of the received "Timing information #1", the radio base station eNB transmits a "Ud TA command #1" for adjusting the transmission timing of a data signal in the third radio link to the mobile station UE#1 via the first radio link.

The mobile station UE#1 adjusts the transmission timing (a subframe) of a data signal in the Ud interface on the basis of the "Ud TA command #1" in step S1010, establishes synchronization in the Ud interface in step S1011, and transmits a data signal to the mobile station UE#2 via the third radio link in the Ud interface in step S1012.

In the mobile communication system according to the first embodiment of the present invention, on the basis of the "Ud preamble #1" that is transmitted from the mobile station UE#1 to the mobile station UE#2, the transmission timing (UE#1→UE#2) of a data signal in the third radio link is adjusted, so that it is possible to appropriately establish synchronization between the mobile station UE#1 and the mobile station UE#2.

(First Modification)

Figure 5:
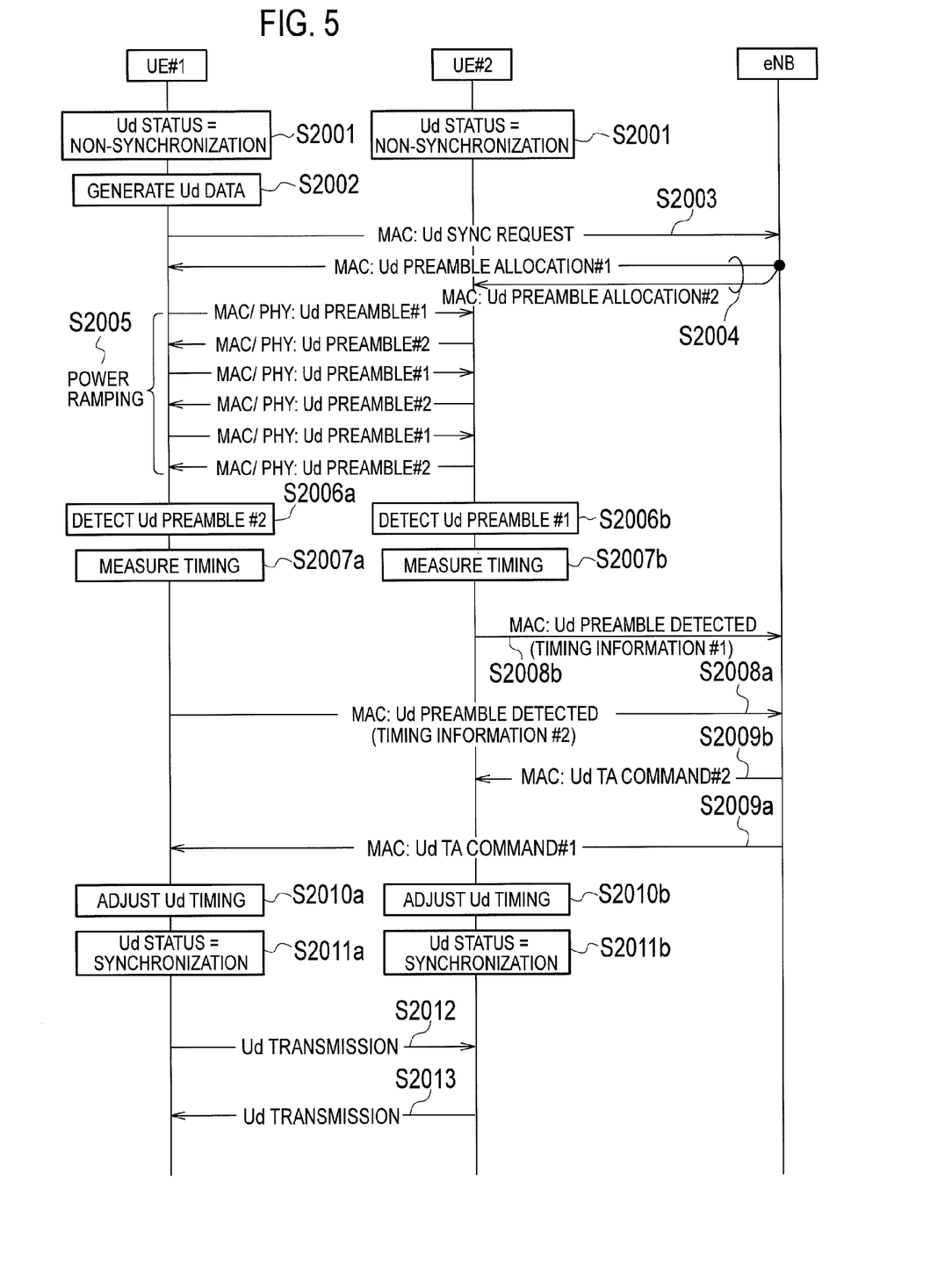
FIG. 5 is a sequence diagram showing the operation of the mobile communication system according to a first modification of the present invention.

With reference to FIG. 5, a mobile communication system according to the present first modification will be described below on the basis of the points of difference from the mobile communication system according to the first embodiment above.

In the mobile communication system according to the present first modification, when the reception unit 21 of the radio base station eNB receives the "Ud sync request" from the mobile station UE#1, the transmission unit 22 is configured to transmit "Ud preamble allocation #1 (UE#1→UE#2)" and "Ud preamble allocation #2 (UE#2→UE#1)" for notifying a radio resource for preamble transmission in the third radio link to the mobile station UE#1 and the mobile station UE#2.

As illustrated in FIG. 5, in the state (step S2001) in which the synchronization of the third radio link has not been established, when the generation of a data signal to be transmitted to the mobile station UE#2 is detected (step S2002), the mobile station UE#1 transmits the "Ud sync request" to the radio base station eNB as the "MAC control element" in step S2003.

Furthermore, it is assumed that the synchronization of the third radio link has also not been established in the mobile station UE#2.

In step S2004, the radio base station eNB transmits the "Ud preamble allocation #1 (UE#1→UE#2)" for notifying the radio resource for preamble transmission in the third radio link to the mobile station UE#1 and the mobile station UE#2 as the "MAC control element", and transmits the "Ud preamble allocation #2 (UE#2→UE#1)" for notifying the radio resource for preamble transmission in the third radio link to the mobile station UE#1 and the mobile station UE#2 as the "MAC control element".

In addition, the "Ud preamble allocation #1 (UE#1→UE#2)" and the "Ud preamble allocation #2 (UE#2→UE#1)" may be transmitted as separate "MAC control elements" or one "MAC control element".

In step S2005, the mobile station UE#1 repeatedly transmits the "Ud preamble #1" to the mobile station UE#2 by using the radio resource (a MAC layer/a physical layer) for preamble transmission, which is notified by the "Ud preamble allocation #1 (UE#1→UE#2)", through the "Power ramping".

In the same manner, the mobile station UE#2 repeatedly transmits the "Ud preamble #2" to the mobile station UE#1 by using the radio resource (a MAC layer/a physical layer) for preamble transmission, which is notified by the "Ud preamble allocation #2 (UE#2→UE#1)", through the "Power ramping".

When the "Ud preamble #2" is detected using the radio resource (the MAC layer/the physical layer) for preamble transmission notified by the "Ud preamble allocation #2 (UE#2→UE#1)" in step S2006a, the mobile station UE#1 measures deviation of the reception timing of the "Ud preamble #2" from a desired timing in step S2007a, and transmits "Ud preamble detected" including "Timing information #2" indicating a result of the measurement to the radio base station eNB in step S2008a.

In the same manner, when the "Ud preamble #1" is detected in step S2006b, the mobile station UE#2 measures deviation of the reception timing of the "Ud preamble #1" from a desired timing in step S2007a, and transmits "Ud preamble detected" including "Timing information #1" indicating a result of the measurement to the radio base station eNB in step S2008a.

In step S2009a, on the basis of the received "Timing information #1", the radio base station eNB transmits a "Ud TA command #1" for adjusting the transmission timing of a data signal in the third radio link to the mobile station UE#1 via the first radio link.

In the same manner, in step S2009b, on the basis of the received "Timing information #2", the radio base station eNB transmits a "Ud TA command #2" for adjusting the transmission timing of a data signal in the third radio link to the mobile station UE#2 via the second radio link.

The mobile station UE#1 adjusts the transmission timing (a subframe) of a data signal in the Ud interface on the basis of the "Ud TA command #1" in step S2010a, establishes synchronization in the Ud interface in step S2011a, and transmits a data signal to the mobile station UE#2 via the third radio link in the Ud interface in step S2012.

In the same manner, the mobile station UE#2 adjusts the transmission timing (a subframe) of a data signal in the Ud interface on the basis of the "Ud TA command #2" in step S2010b, establishes synchronization in the Ud interface in step S2011b, and transmits a data signal to the mobile station UE#1 via the third radio link in the Ud interface in step S2013.

(Second Modification)

Figure 6:
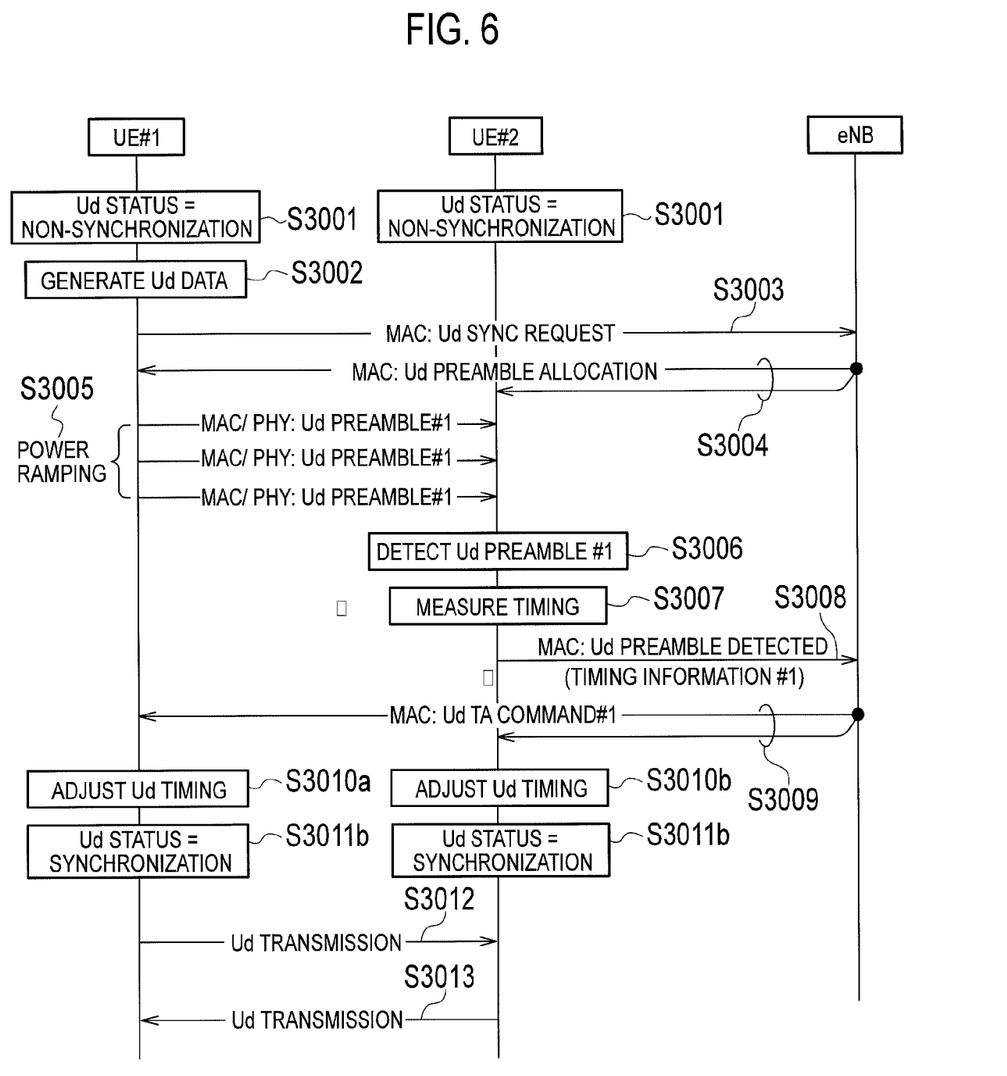
FIG. 6 is a sequence diagram showing the operation of the mobile communication system according to a second modification of the present invention.

With reference to FIG. 6, a mobile communication system according to a present second modification will be described below on the basis of the points of difference from the mobile communication system according to the first embodiment above.

In the mobile communication system according to the present second modification, based on the assumption that propagation delay in a direction from the mobile station UE#1 to the mobile station UE#2 in the third radio link is principally the same as propagation delay in a direction from the mobile station UE#2 to the mobile station UE#1 in the third radio link, the transmission unit 22 of the radio base station eNB is configured to transmit the "Ud TA command #1" to both the mobile station UE#1 and the mobile station UE#2.

As illustrated in FIG. 6, in the state (step S3001) in which the synchronization of the third radio link has not been established, when the generation of a data signal to be transmitted to the mobile station UE#2 is detected (step S3002), the mobile station UE#1 transmits the "Ud sync request" to the radio base station eNB as the "MAC control element" in step S3003.

Furthermore, it is assumed that the synchronization of the third radio link has also not been established in the mobile station UE#2.

In step S3004, the radio base station eNB transmits the "Ud preamble allocation #1 (UE#1→UE#2)" for notifying the radio resource for preamble transmission in the third radio link to the mobile station UE#1 and the mobile station UE#2 as the "MAC control element".

In step S3005, the mobile station UE#1 repeatedly transmits the "Ud preamble #1" to the mobile station UE#2 by using the radio resource (the MAC layer/the physical layer) for preamble transmission, which is notified by the "Ud preamble allocation #1 (UE#1→UE#2)", through the "Power ramping".

When the "Ud preamble #1" is detected by using the radio resource (the MAC layer/the physical layer) for preamble transmission notified by the "Ud preamble allocation #1 (UE#1→UE#2)" in step S3006, the mobile station UE#2 measures deviation of the reception timing of the "Ud preamble #1" from a desired timing in step S3007, and transmits "Ud preamble detected" including "Timing information #1" indicating a result of the measurement to the radio base station eNB in step S3008.

In step S3009, on the basis of the received "Timing information #1", the radio base station eNB transmits a "Ud TA command #1" for adjusting the transmission timing of a data signal in the third radio link to the mobile station UE#1 and the mobile station UE#2 via the first radio link and the second radio link.

The mobile station UE#1 adjusts the transmission timing (a subframe) of a data signal in the Ud interface on the basis of the "Ud TA command #1" in step S3010a, establishes synchronization in the Ud interface in step S3011a, and transmits a data signal to the mobile station UE#2 via the third radio link in the Ud interface in step S3012.

In the same manner, the mobile station UE#2 adjusts the transmission timing (a subframe) of a data signal in the Ud interface on the basis of the "Ud TA command #1" in step S3010b, establishes synchronization in the Ud interface in step S3011b, and transmits a data signal to the mobile station UE#1 via the third radio link in the Ud interface in step S3013.

In addition, when the preamble is transmitted a plurality of times, frequency hopping may also be applied.

The characteristics of the present embodiment as described above may be expressed as follows.

A first characteristic of the present embodiment is summarized that a mobile communication method, used in a case where a first radio link has been set in a Uu interface (a radio base station interface) between a mobile station UE#1 (a first mobile station) and a radio base station eNB, a second radio link has been set in the Uu interface between a mobile station UE#2 (a second mobile station) and the radio base station eNB, and a third radio link has been set in a Ud interface (an interface between mobile stations) between the mobile station UE#1 and the mobile station UE#2, includes: a step of transmitting, by the mobile station UE#1, a "Ud sync request (a synchronization request signal)" to the radio base station eNB via the first radio link when the generation of a data signal to be transmitted to the mobile station UE#2 is detected in the state in which the synchronization of the third radio link has not been established; a step of transmitting, by the radio base station eNB, "Ud preamble allocation (an assignment signal)" for notifying a radio resource for first preamble transmission in the third radio link to the mobile station UE#1 and the mobile station UE#2 via the first radio link and the second radio link in response to the "Ud sync request"; a step of transmitting, by the mobile station UE#1, a "Ud preamble #1 (a first preamble)" to the mobile station UE#2 by using the radio resource for first preamble transmission; a step of transmitting, by the mobile station UE#2, "Timing information #1 (first timing information)" indicating deviation of a reception timing of the "Ud preamble #1" from a desired timing to the radio base station eNB via the second radio link on the basis of the received "Ud preamble #1"; and a step of transmitting, by the radio base station eNB, a "Ud TA command #1 (first adjustment information)" for adjusting a transmission timing of a data signal in the third radio link to the mobile station UE#1 via the first radio link on the basis of the received "Timing information #1".

In the first characteristic of the present embodiment, the mobile communication method may further include: a step of notifying, by the radio base station eNB, the mobile station UE#2 and the mobile station UE#1 of a radio resource for second preamble transmission in the third radio link via the second radio link and the first radio link in response to the "Ud sync request"; a step of transmitting, by the mobile station UE#2, a "Ud preamble #2 (a second preamble)" to the mobile station UE#1 by using the radio resource for second preamble transmission; a step of transmitting, by the mobile station UE#1, "Timing information #2 (second timing information)" indicating deviation of a reception timing of the "Ud preamble #2" from a desired timing to the radio base station eNB via the first radio link on the basis of the received "Ud preamble #2"; and a step of transmitting, by the radio base station eNB, a "Ud TA command #2 (second adjustment information)" for adjusting a transmission timing of a data signal in the third radio link to the mobile station UE#2 via the second radio link on the basis of the received "Timing information #2".

In the first characteristic of the present embodiment, the mobile communication method may further include: a step of transmitting, by the radio base station eNB, the "Ud TA command #1" to the mobile station UE#2 via the second radio link.

In the first characteristic of the present embodiment, the "Ud sync request", the "Timing information #1", the "Timing information #2", the "Ud TA command #1", and the "Ud TA command #2" may be transmitted as a "MAC control element (a MAC control signal)".

In the first characteristic of the present embodiment, when the "Ud TA command #1" is not received within a predetermined period, the mobile station UE#1 may notify the radio base station eNB of "Ud failure (a message for informing a fault of the third radio link)".

In the first characteristic of the present embodiment, when it is not possible to detect the "Ud preamble #1" within a predetermined period, the mobile station UE#2 may notify the radio base station eNB of the "Ud failure".

In the first characteristic of the present embodiment, the "Ud failure" may also be transmitted as an RRC message.

In addition, the operation of the above-mentioned radio base station eNB or mobile station UE#1/UE#2 may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. The ASIC may be arranged in the radio base station eNB and the mobile station UE#1/UE#2. Furthermore, such a storage medium and processor may be arranged in the radio base station eNB and the mobile station UE#1/UE#2 as discrete components.

Thus, the present invention has been explained in detail by using the above-described embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

In addition, the entire content of Japanese Patent Application No. 2011-112659 (filed on May 19, 2011) is incorporated in the present specification by reference.

INDUSTRIAL APPLICABILITY

As described above, according to the present invention, it is possible to provide a mobile communication method capable of appropriately establishing synchronization between the mobile station UE#1 and the mobile station UE#2 in direct communication between the mobile station UE#1 and the mobile station UE#2.

REFERENCE SIGNS LIST

UE . . . Mobile station
eNB . . . Radio base station
11 . . . Synchronization state management unit
12, 22 . . . Transmission unit
13, 21 . . . Reception unit
14 . . . Measurement unit
15 . . . Adjustment unit

The invention claimed is:

1. A mobile communication method, used in a case where a first radio link has been set in a radio base station interface between a first mobile station and a radio base station, a second radio link has been set in a radio base station interface between a second mobile station and the radio base station, and a third radio link has been set in an inter-mobile station interface between the first mobile station and the second mobile station, comprising:

a step of transmitting, by the first mobile station, a synchronization request signal to the radio base station via the first radio link when generation of a data signal to be transmitted to the second mobile station is detected in a state in which synchronization of the third radio link has not been established;

a step of notifying, by the radio base station, the first mobile station and the second mobile station of a radio resource for first preamble transmission in the third radio link via the first radio link and the second radio fink in response to the synchronization request signal;

a step of transmitting, by the first mobile station, a first preamble to the second mobile station by using the radio resource for first preamble transmission;

a step of transmitting, by the second mobile station, first timing information indicating deviation of a reception timing of the first preamble from a desired timing to the radio base station via the second radio link on a basis of the received first preamble; and a step of transmitting, by the radio base station, first adjustment information for adjusting a transmission timing of a data signal in the third radio link to the first mobile station via the first radio link on a basis of the received first timing information, wherein when the first adjustment information is not received within a predetermined period, the first mobile station notifies the radio base station eNB of a message for informing a fault of the third radio link.

2. The mobile communication method according to claim 1, further comprising:

a step of notifying, by the radio base station, the second mobile station and the first mobile station of a radio resource for second preamble transmission in the third radio link via the second radio link and the first radio link in response to the synchronization request signal;

a step of transmitting, by the second mobile station, a second preamble to the first mobile station by using the radio resource for second preamble transmission;

a step of transmitting, by the first mobile station, second timing information indicating deviation of a reception timing of the second preamble from a desired timing to the radio base station via the first radio link on a basis of the received second preamble; and a step of transmitting, by the radio base station, second adjustment information for adjusting a transmission timing of a data signal in the third radio link to the second mobile station via the second radio link on a basis of the received second timing information.

3. The mobile communication method according to claim 1, further comprising: a step of transmitting, by the radio base station, the first adjustment information to the second mobile station via the second radio link.

4. The mobile communication method according to claim 1, wherein the synchronization request signal, the timing information, and the adjustment information are transmitted as a MAC control signal.

5. The mobile communication method according to claim 1, wherein when it is not possible to detect the first preamble within a predetermined period, the second mobile station notifies the radio base station of a message for informing a fault of the third radio link.

6. The mobile communication method according to claim 1, wherein the message is transmitted as an RRC message.

7. The mobile communication method according to claim 2, wherein the synchronization request signal, the timing information, and the adjustment information are transmitted as a MAC control signal.

8. The mobile communication method according to claim 3, wherein the synchronization request signal, the timing information, and the adjustment information are transmitted as a MAC control signal.

9. The mobile communication method according to claim 5, wherein the message is transmitted as an RRC message.

* * * * *